United States Patent
Saito

(10) Patent No.: US 10,522,286 B2
(45) Date of Patent: Dec. 31, 2019

(54) DIELECTRIC FILM AND FILM CAPACITOR

(71) Applicant: TOYOTA JIDOSHA KABUSHIKI KAISHA, Toyota-shi, Aichi-ken (JP)

(72) Inventor: Takahiro Saito, Okazaki (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/847,040

(22) Filed: Dec. 19, 2017

(65) Prior Publication Data

US 2018/0182547 A1   Jun. 28, 2018

(30) Foreign Application Priority Data

Dec. 22, 2016 (JP) ................................ 2016-249904

(51) Int. Cl.
*H01G 4/32* (2006.01)
*H01G 4/06* (2006.01)

(52) U.S. Cl.
CPC ............... *H01G 4/06* (2013.01); *H01G 4/32* (2013.01)

(58) Field of Classification Search
CPC .. H01G 4/06; H01G 4/32; H01G 4/28; H01G 4/005; H01G 4/10; H01G 4/12; H01G 4/1218
See application file for complete search history.

(56) References Cited

U.S. PATENT DOCUMENTS

| | | | | |
|---|---|---|---|---|
| 2003/0142461 A1* | 7/2003 | Decker | ............... | H01G 4/30 361/306.3 |
| 2007/0108490 A1* | 5/2007 | Tan | ............... | H01G 4/20 257/296 |
| 2010/0202100 A1* | 8/2010 | Koh | ............... | H01G 4/206 361/323 |
| 2014/0160623 A1* | 6/2014 | Baer | ............... | B32B 27/08 361/301.4 |
| 2014/0347780 A1* | 11/2014 | Takeoka | ............... | H01G 4/015 361/275.4 |
| 2014/0355174 A1* | 12/2014 | Kamiura | ............... | H01G 4/012 361/305 |
| 2016/0099109 A1 | 4/2016 | Saito | | |
| 2016/0260545 A1* | 9/2016 | Pankaj | ............... | H01G 4/186 |
| 2016/0372264 A1* | 12/2016 | Maeda | ............... | H01G 4/18 |
| 2017/0178817 A1* | 6/2017 | Silvi | ............... | H01G 4/32 |

FOREIGN PATENT DOCUMENTS

| | | |
|---|---|---|
| CN | 105489375 A | 4/2016 |
| JP | 04-243110 A | 8/1992 |
| JP | 2010192787 A | 9/2010 |
| WO | 2009/017109 A1 | 2/2009 |

* cited by examiner

*Primary Examiner* — Nguyen T Ha
(74) *Attorney, Agent, or Firm* — Sughrue Mion, PLLC

(57) ABSTRACT

A dielectric film for a film capacitor includes a center portion made of a polymer and composite oxide particles and end portions made of only a polymer. The end portions are provided on both sides of the center portion.

5 Claims, 2 Drawing Sheets

DIELECTRIC FILM AND FILM CAPACITOR

INCORPORATION BY REFERENCE

The disclosure of Japanese Patent Application No. 2016-249904 filed on Dec. 22, 2016 including the specification, drawings and abstract is incorporated herein by reference in its entirety.

BACKGROUND

1. Technical Field

The disclosure relates to a dielectric film and a film capacitor formed of the wound dielectric films.

2. Description of Related Art

A film capacitor having a high dielectric strength, an excellent temperature characteristic and an excellent frequency characteristic is applied to, for example, an inverter circuit for a vehicle, or the like. An existing film capacitor is generally a wound capacitor formed of wound dielectric films. Furthermore, a film capacitor having a self-recovery function of recovering from an electrical breakdown state of the capacitor has been developed.

A size reduction of a film capacitor is a conventional request; however, application of a dielectric film with a high dielectric constant is indispensable in order to reduce the size of a film capacitor. For the purpose of a significant size reduction of a film capacitor with a view to mount the film capacitor on a substrate, there is a limit to use a dielectric film alone, and it is conceivable to apply a dielectric film made of a composite material composed of a high-dielectric polymer and, for example, a high-dielectric filler.

International Application Publication No. 2009/017109 describes a high-dielectric film. The high-dielectric film is composed of a vinylidene fluoride polymer and composite oxide particles, such as magnesium titanate, and includes 10 to 500 parts by mass of the composite oxide particles to 100 parts by mass of the vinylidene fluoride polymer.

SUMMARY

The high-dielectric film described in International Application Publication No. 2009/017109 enables a high dielectric constant and a thin profile, and it is possible to provide a high-dielectric film with an excellent windability and a small dielectric loss.

However, when a dielectric film made of a composite material composed of a high-dielectric polymer and a high-dielectric filler is applied, the ratio of the polymer that contributes to extensibility decreases. This causes the poor extensibility of the dielectric film and makes the high-dielectric film brittle, so a break can occur during winding of the dielectric film.

The invention provides a dielectric film that has an excellent dielectric constant and a high extensibility and that does not break during winding, and a film capacitor formed of the wound dielectric films.

A first aspect of the disclosure provides a dielectric film for a film capacitor. The dielectric film includes a center portion and end portions. The center portion is made of a first polymer and composite oxide particles. The end portions are made of only a second polymer. The end portions are respectively provided on both sides of the center portion.

The dielectric film according to the first aspect of the disclosure includes the center portion and the end portions on both sides. The center portion is made of a composite material made of a first polymer and composite oxide particles. The end portions are made of only a second polymer. Therefore, the center portion allows a size reduction of the dielectric film while ensuring a high dielectric constant, and the end portions prevent a break of the dielectric film during winding while ensuring extensibility.

As for prevention of a break, the inventors found that the starting point of a break occurs at the end portions of a dielectric film when the dielectric film made of only the composite material is wound. The dielectric film is formed of the center portion and the end portions, and the end portions are made of only a polymer. Thus, high extensibility is imparted to the dielectric film. This prevents occurrence of the starting point of a break.

The applicable polymers may include not only a polymer, such polyvinylidene fluoride (PVDF) and polycarbonate (PC), but also, for example, a copolymer of a polymer, such as polyvinylidene fluoride, and a copolymerizable monomer, such as tetrafluoroethylene (TFE).

On the other hand, the applicable composite oxide particles include, for example, a material made of a compound of a group 2 metallic element from the second period to the fifth period in the periodic table, titanium and oxygen. Examples of the material include barium titanium oxide, magnesium titanate, calcium titanate, and the like. The composite oxide particles include not only particles of a composite oxide in the literature but also a filler of a composite oxide cut into a length of about several millimeters.

A second aspect of the disclosure provides a film capacitor. The film capacitor includes a metallized film cylinder, a metal sprayed portion and an external lead-out terminal. The metallized film cylinder is formed by winding two metallized films stacked on top of each other. Each metallized film is composed of the above-described dielectric film and a metal evaporated coating formed on a surface of the dielectric film. The metal sprayed portion is formed on each of two electrode lead-out faces of the metallized film cylinder. The external lead-out terminal is bonded to each of the metal sprayed portions.

With the film capacitor according to the second aspect of the disclosure, the dielectric films that constitute the metallized film cylinder do not break or are difficult to break when the dielectric films are being wound, so the film capacitor is formed with a minimized size while a decrease in product yield is suppressed.

As can be understood from the above description, with the dielectric film according to the first aspect of the disclosure, extensibility is ensured by the end portions made of only a polymer while a high dielectric constant is ensured by the center portion made of a composite material composed of a polymer and composite oxide particles. This prevents occurrence of the starting point of a break during winding of the dielectric film. Therefore, the film capacitor according to the second aspect of the disclosure, which is formed of the wound dielectric films, is a film capacitor having an excellent dielectric constant and a minimized size.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, a dielectric film and a film capacitor according to an embodiment of the disclosure will be described with reference to the accompanying drawings.

Embodiment of Dielectric Film and Film Capacitor

Figure 1:
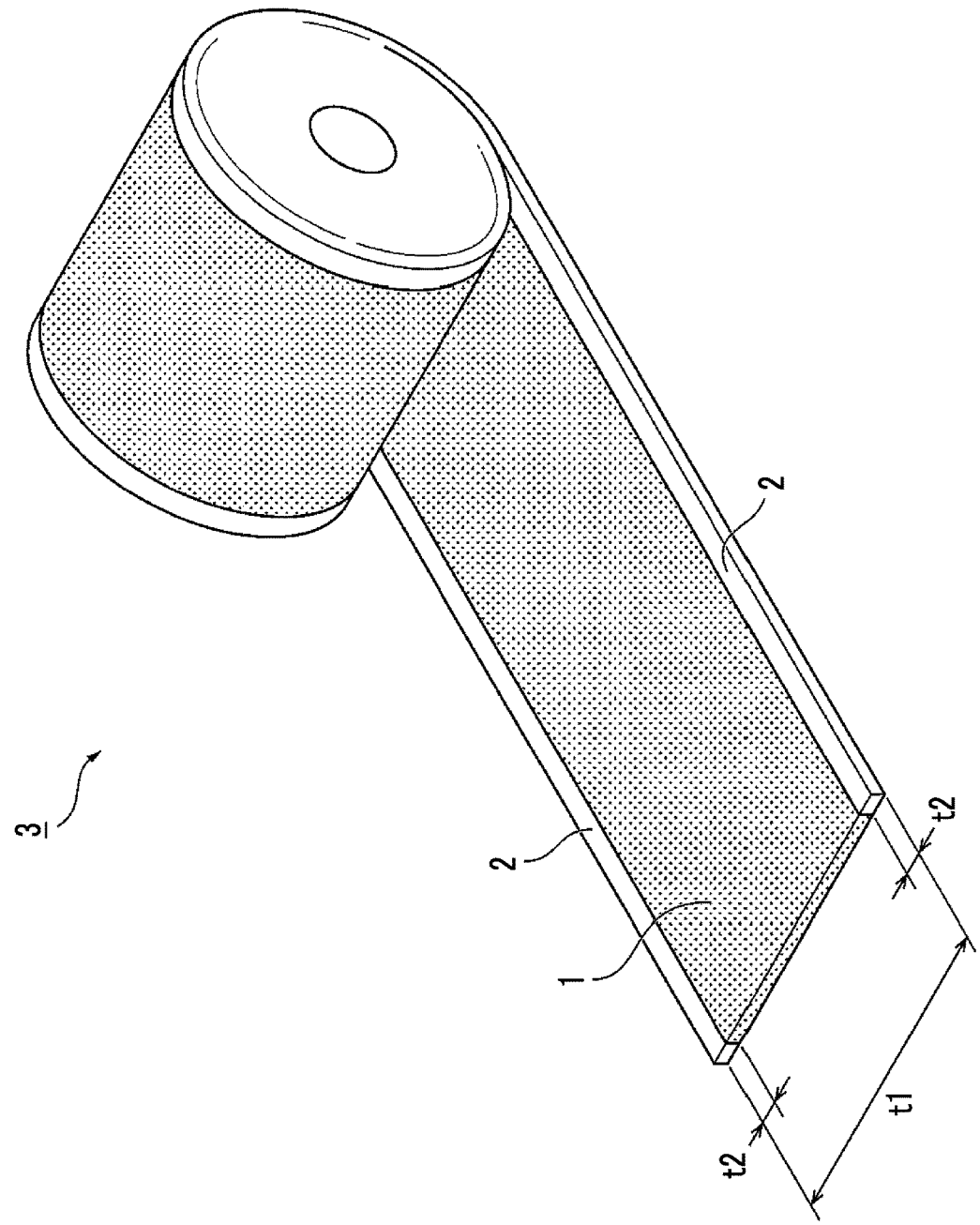
FIG. 1 is a perspective view of a dielectric film according to an embodiment of the disclosure.

FIG. 1 is a perspective view of the dielectric film according to the embodiment of the disclosure. The dielectric film 3 shown in FIG. 1 is formed of a center portion 1 and end portions 2 on both sides of the center portion 1.

The center portion 1 is made of a composite material composed of a polymer resin and composite oxide particles.

The applicable polymer resins include not only a polymer, such as polyvinylidene fluoride (PVDF), polycarbonate (PC), polyester, polyethylene naphthalate (PEN), polyethylene terephthalate (PET), polypropylene and a silicone resin but also, for example, a copolymer resin of a polymer, such as polyvinylidene fluoride, and a copolymerizable monomer, such as tetrafluoroethylene (TFE).

On the other hand, the applicable composite oxide particles include a material made of a compound of a group 2 metallic element from the second period to the fifth period in the periodic table, titanium and oxygen, and more specifically a filler, such as barium titanium oxide, magnesium titanate, calcium titanate, strontium titanate and beryllium titanate.

Since the dielectric film 3 includes the center portion 1 made of a composite material composed of a polymer resin and composite oxide particles, the high dielectric constant of the dielectric film 3 is ensured. This leads to a size reduction of the dielectric film 3, and leads to a size reduction of the film capacitor formed of the dielectric films 3.

Since the dielectric film 3 includes the end portions 2 made of only a polymer resin and respectively provided on both sides of the center portion 1, the extensibility of the dielectric film 3 is ensured. This prevents occurrence of the starting point of a break during winding of the dielectric film 3.

In order to provide a high conformability of the center portion 1 with the end portions 2, resins made of the same material are desirably applied to both polymer resins.

Where the overall width of the dielectric film 3 is t1 and the width of each end portion 2 is t2, the width of the center portion 1 and the width of each end portion 2 are set such that the relationship 1 mm<t2<0.2t1 is satisfied. Thus, while a decrease in capacitor capacitance due to the end portions 2 is minimized, it is possible to effectively prevent occurrence of the starting point of a break during winding of the dielectric film 3.

Figure 2:
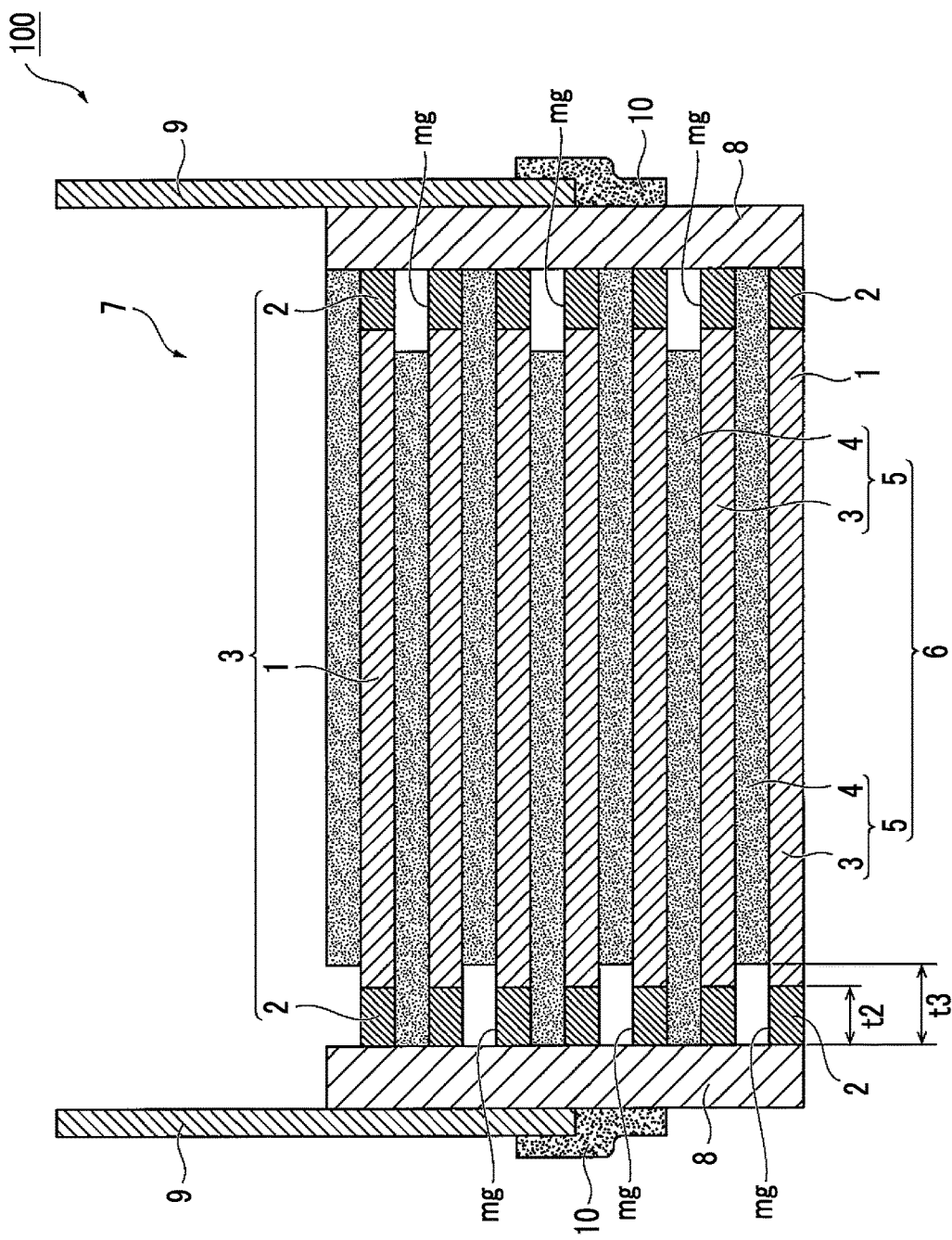
FIG. 2 is a longitudinal sectional view of a film capacitor according to the embodiment of the disclosure.

Next, the film capacitor according to the embodiment will be generally described with reference to FIG. 2. The film capacitor 100 shown in FIG. 2 includes a metallized film cylinder 7. The metallized film cylinder 7 is formed of a wound metallized film laminate 6. The metallized film laminate 6 is formed by stacking two metalized films 5 on top of each other. Each of the metallized films 5 is formed of the dielectric film 3 and a metal evaporated coating 4. The metal evaporated coating 4 is formed on the surface of the dielectric film 3.

Each metalized films 5 has non-evaporated slits (not shown) and an insulating margin mg. The insulating margins mg of the two metalized films 5 are respectively provided on mutually opposites sides.

In each metal evaporated coating 4 that constitutes a corresponding one of the metalized films 5, the plurality of non-evaporated slits are provided so as to be spaced from one another. A fuse portion (not shown) having a narrow width is provided between the ends of any adjacent two non-evaporated slits. Thus, each metal evaporated coating 4 is divided into a plurality of segments each surrounded by the corresponding non-evaporated slits.

The metallized film laminate 6 is formed by stacking the metalized films 5 on top of each other such that both the insulating margins mg do not coincide with each other in the stacking direction. The metallized film laminate 6 is wound. Thus, the metallized film cylinder 7 is formed.

Furthermore, a metal sprayed portion 8 (metallikon electrode) is provided on each of two electrode lead-out faces on both ends of the metallized film cylinder 7. An external lead-out terminal 9 (bus bar) is connected to each metal sprayed portion 8 via a solder layer 10. Thus, the film capacitor 100 is formed.

When the width t2 of each of the end portions 2 that constitute the dielectric film 3 is set so as to be narrower than the width t3 of the insulating margin mg, a decrease in capacitor capacitance due to the end portions 2 is minimized.

With the film capacitor 100, the dielectric films 3 that constitute the metallized film cylinder 7 do not break or are difficult to break when the dielectric films 3 are being wound, so the film capacitor 100 is formed with a minimized size while a decrease in product yield is suppressed.

Experiments and Results of Verification on Probability of Fatigue Failure when Dielectric Film was Bent and Volume of Capacitor Element at 100 μF The inventors carried out tests for verifying the probability of fatigue failure at the time when a dielectric film was bent and the volume of a dielectric film wound body at 100 μF.

In a manufacturing method for a dielectric film, a dielectric film was manufactured in a wet process in which a polymer resin is dissolved in a solvent into slurry, the slurry is applied and then fired. The employed materials and the size of the manufactured capacitor element (dielectric film wound body) were as follows. The polymer resin was PVDF. The film dielectric constant of each end portion was 10. The composite oxide particles were barium titanium oxide (BTO). The film dielectric constant of the center portion made of a composite material was 30. The thickness of the dielectric film was 3 μm. The film width was 50 mm. The margin width was 4 mm. The evaporation pattern of the metal evaporated coating was a solid fill. The capacitor element capacitance was 100 μF. The size of the capacitor element was determined to a size required for a capacitance of 100 μF. The capacitor elements according to Examples 1 to 4 were formed of the center portion and the end portions, shown in FIG. 1. The capacitor element according to Comparative Example 1 was made of PVDF alone. The capacitor element according to Comparative Example 2 was made of a composite material composed of PVDF and BTO. The capacitor element according to Comparative Example 3 was made such that an EVA layer was formed on the surface of a composite material composed of PVDF and BTO.

Tables 1A and 1B show the compositions of the dielectric films according to Examples 1 to 4 and Comparative Examples 1 to 3, the width of each end portion in the Examples, and verification results on the manufacturability of each dielectric film, the probability of fatigue failure at the time when the dielectric film was bent, and the size of each capacitor element at 100 μF. As for the probability of fatigue failure at the time of bending, the numerator indicates the number of breaks, and the denominator indicates the number of tests.

TABLE 1A

|  | Example 1 | Example 2 | Example 3 | Example 4 |
|---|---|---|---|---|
| Configuration of Dielectric Film | Configuration of FIG. 1 | Configuration of FIG. 1 | Configuration of FIG. 1 | Configuration of FIG. 1 |
| Width of End Portion | 4 mm | 6 mm | 2 mm | 8 mm |
|  | Smaller Than or Equal to Margin (8% of Overall Width) | Larger Than or Equal to Margin (12% of Overall Width) | Smaller Than or Equal to Margin (4% of Overall Width) | Larger Than or Equal to Margin (20% of Overall Width) |
| Manufacturability | Allowed | Allowed | Difficult | Allowed |
| Probability of Fatigue Failure during Winding | 0/3 Good | 0/3 Good | 0/3 Good | 0/3 Good |
| Volume at 100 μF | 4.1 cm$^3$ | 4.3 cm$^3$ | 4.1 cm$^3$ | 5.0 cm$^3$ |

TABLE 1B

|  | Comparative Example 1 | Comparative Example 2 | Comparative Example 3 |
|---|---|---|---|
| Configuration of Dielectric Film | Polymer Resin (PVDF) | Composite Material (PVDF + BTO) | 0.1-μm EVA Layer on Composite Material |
| Width of End Portion | — | — | — |
| Manufacturability | Allowed | Allowed | Unknown |
| Probability of Fatigue Failure during Winding | 0/3 Good | 3/3 Poor | Unknown |
| Volume at 100 μF | 12.4 cm$^3$ | 4.1 cm$^3$ | 6.0 cm$^3$ |

Tables 1A and 1B prove that, in any of Examples 1 to 4, the probability of fatigue failure at the time when the dielectric film was bent is zero and the volume at 100 μF is a small size equivalent to that of Comparative Example 2.

In contrast, Tables 1A and 1B prove that the probability of fatigue failure at the time of bending is 100% although the size of the dielectric film according to Comparative Example 2 is small, and also proves that the volume of the dielectric film according to Comparative Example 1 and the volume of the dielectric film according to Comparative Example 3 are relatively large at 100 μF.

According to the experimental results, with the film capacitor formed of the dielectric films according to the aspect of the disclosure, it is understood that the dielectric films do not break when the dielectric film is being wound and the film capacitor having a minimized size is obtained.

The embodiment of the disclosure is described in detail with reference to the accompanying drawings; however, a specific configuration is not limited to the embodiment. The disclosure also encompasses a configuration with a design change, or the like, without departing from the scope of the disclosure.

What is claimed is:

1. A dielectric film for a film capacitor, the dielectric film comprising:
   a center portion made of a first polymer and composite oxide particles; and
   end portions made of only a second polymer, the end portions being respectively provided on both sides of the center portion, wherein
   an overall width of the dielectric film is t1 and a width of each end portion is t2, and 1 mm<t2<0.2t1.

2. The dielectric film according to claim 1, wherein the composite oxide particles are a filler made of an oxide selected from among barium titanium oxide, magnesium titanate, calcium titanate, strontium titanate and beryllium titanate.

3. The dielectric film according to claim 1, wherein the first polymer that constitutes the center portion is a same material as the second polymer that constitutes the both end portions.

4. A film capacitor comprising:
   a metallized film cylinder in which two metallized films stacked on top of each other are wound, each metallized film being composed of the dielectric film according to claim 1 and a metal evaporated coating arranged on a surface of the dielectric film;
   a metal sprayed portion arranged on each of two electrode lead-out faces of the metallized film cylinder; and
   an external lead-out terminal bonded to each of the metal sprayed portions.

5. The film capacitor according to claim 4, wherein the metallized film includes an insulating margin where the metal evaporated coating is not formed, and
   a width of each end portion that constitutes the dielectric film is narrower than a width of the insulating margin.

* * * * *